Figure 1:
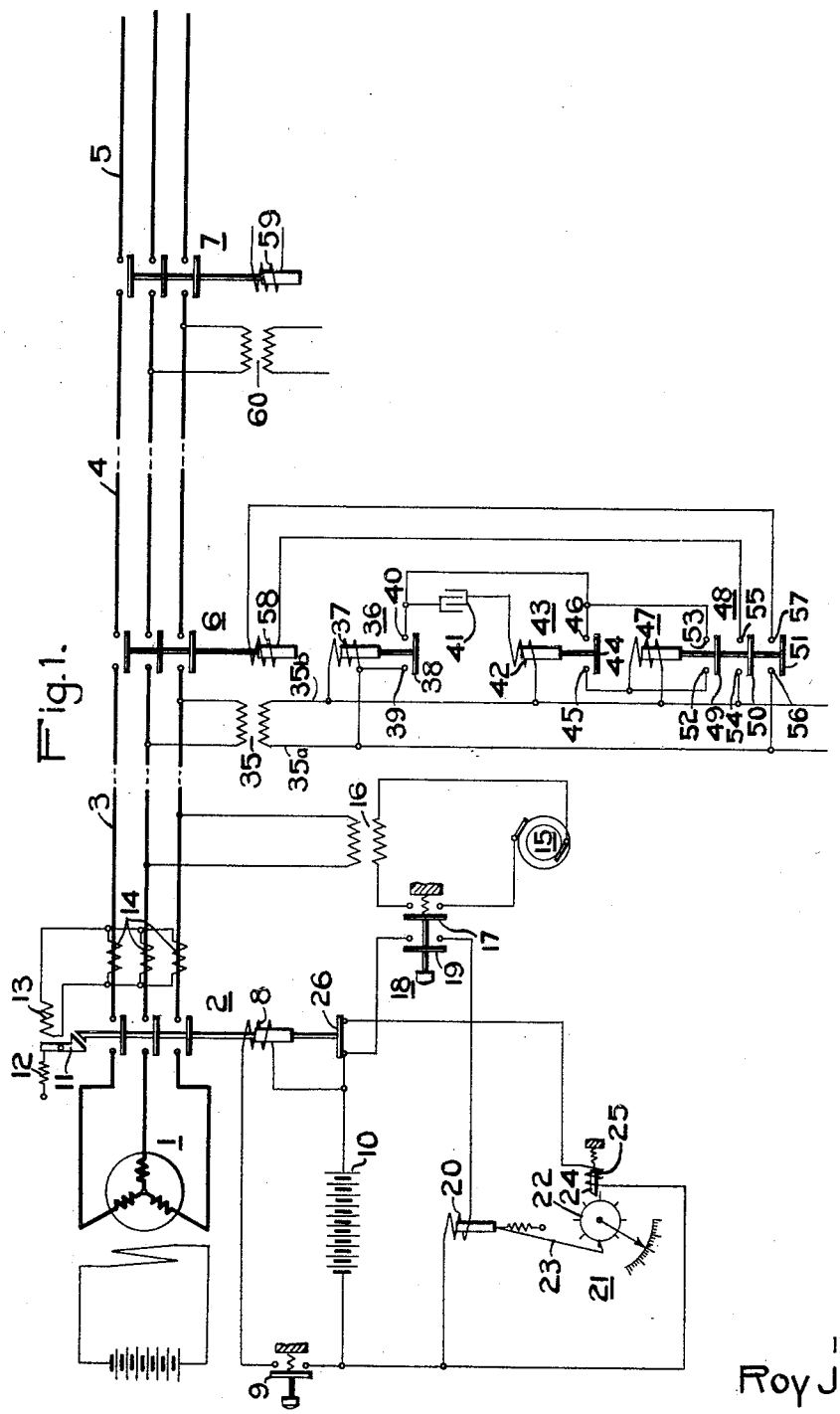

April 26, 1932.   R. J. WENSLEY   1,855,735
DISTRIBUTION SYSTEM
Filed Dec. 24, 1927   3 Sheets-Sheet 1

INVENTOR
Roy J. Wensley.
BY
Wesley S. Carr
ATTORNEY

April 26, 1932. R. J. WENSLEY 1,855,735
DISTRIBUTION SYSTEM
Filed Dec. 24, 1927 3 Sheets-Sheet 2
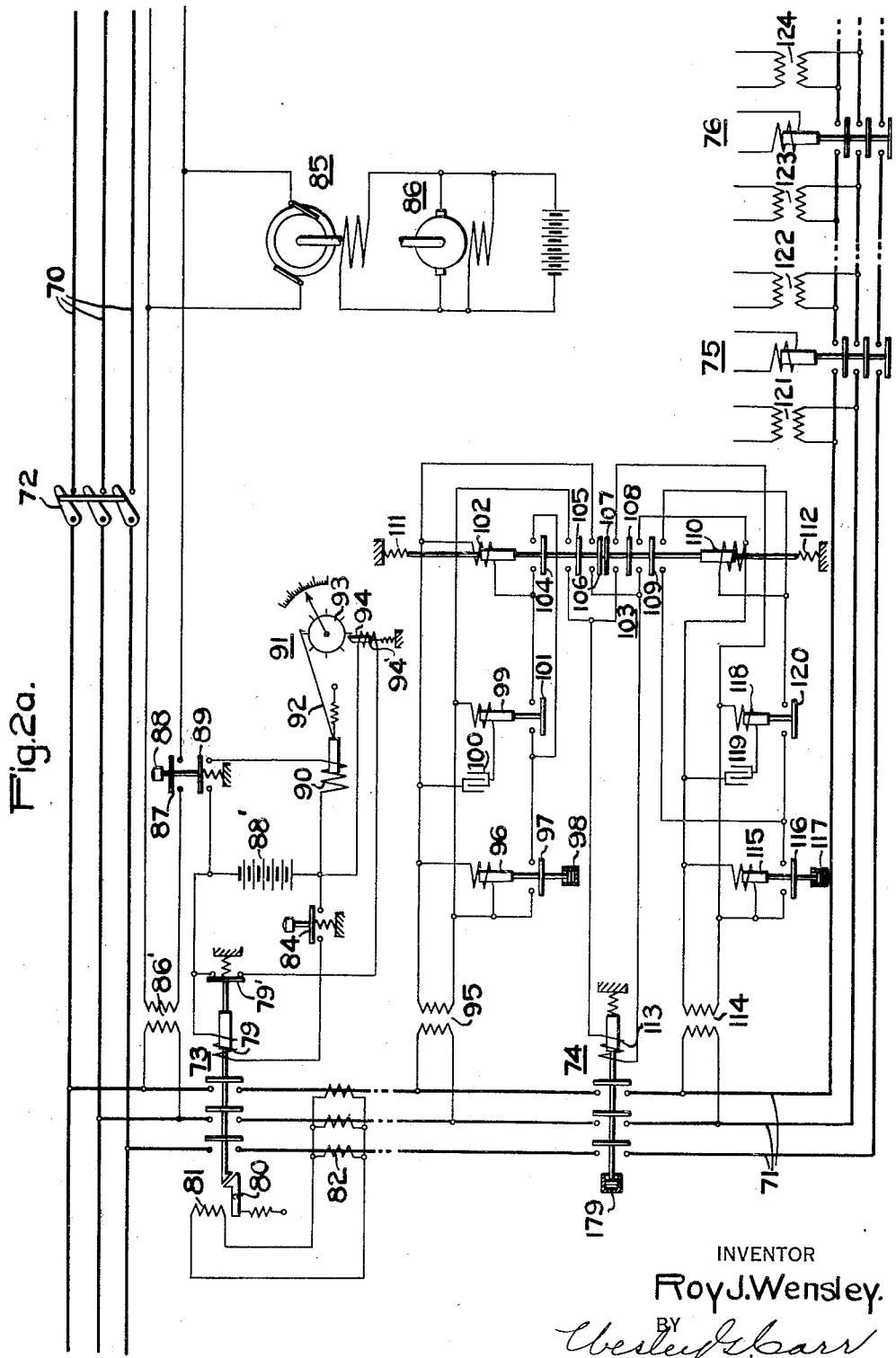
INVENTOR
Roy J. Wensley.
BY
Wesley J. Carr
ATTORNEY

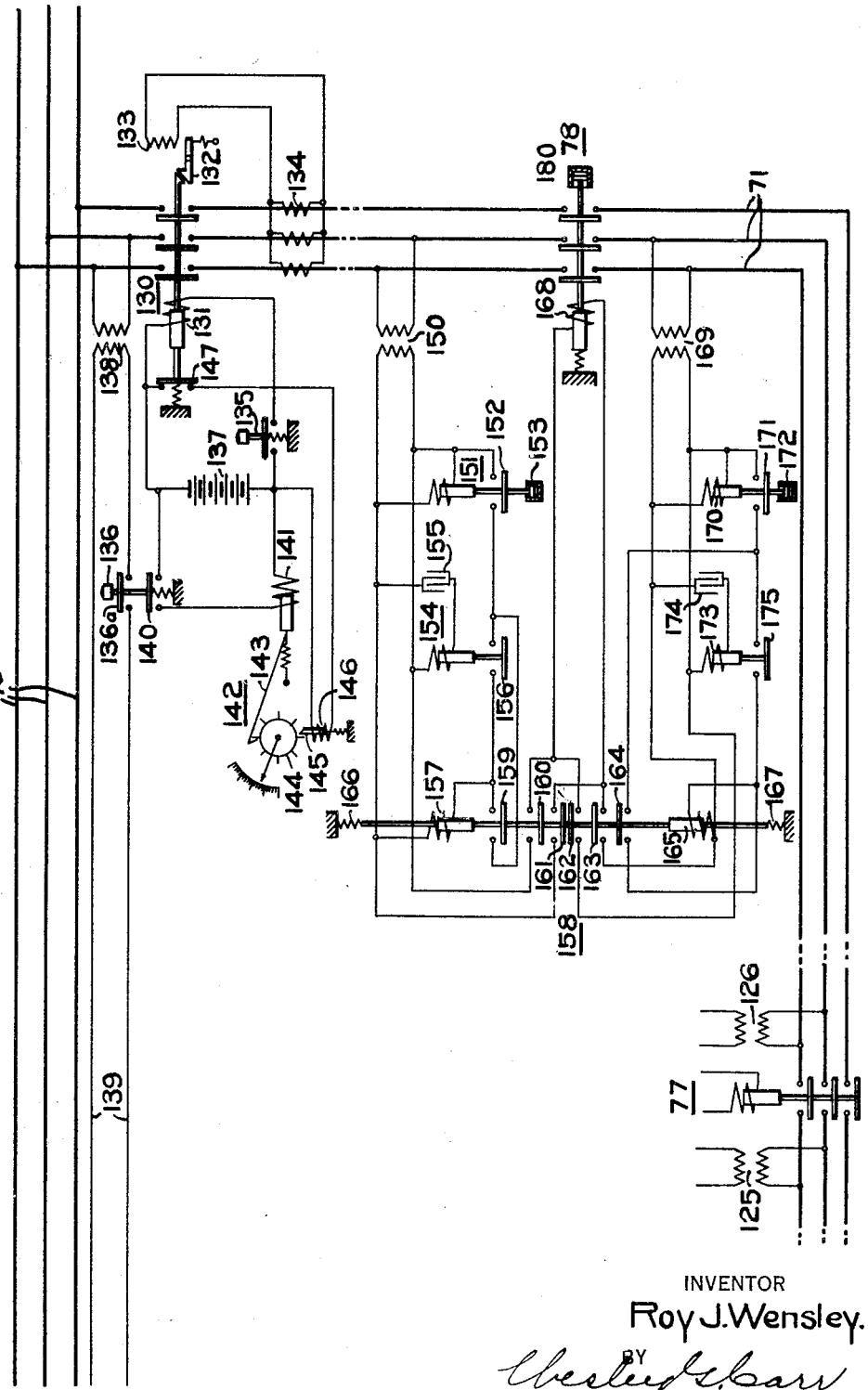

Patented Apr. 26, 1932

1,855,735

UNITED STATES PATENT OFFICE

ROY J. WENSLEY, OF EDGEWOOD, PENNSYLVANIA, ASSIGNOR TO WESTINGHOUSE ELECTRIC & MANUFACTURING COMPANY, A CORPORATION OF PENNSYLVANIA

DISTRIBUTION SYSTEM

Application filed December 24, 1927. Serial No. 242,350.

My invention pertains to electrical distribution systems, and more particularly to a distribution system of the loop or ring type.

It is desirable, in transmission systems of this type, that, on the occurrence of a fault in any one section, the interruption of service be limited to that section alone, and that continuous service be maintained on all remaining sections, insofar as is possible.

The principal object of my invention is to provide means whereby, upon the occurence of a fault on a ring transmission line of such value as to cause a service interruption, service may be promptly restored on all sections except the one in which the fault occurred.

Another object of my invention is to provide a ring transmission line of several sections, so that, on the occurrence of a fault in any section of the system, all sections will be isolated and the power source disconnected.

Another object of my invention is to provide means for successively reclosing the sectionalizing circuit breakers provided for disconnecting the sections of the line from each other, to build up the complete ring, if the fault is of a temporary nature, or to reconnect all sections but the faulty section if the fault persists.

A further object of this invention is to provide indicating means at a control station, whereby the number of sections re-connected to the power source may be determined, so that the faulty section may be located.

A still further object of my invention is to utilize a high-frequency control current to govern the reclosing of the sectionalizing circuit breakers between the adjacent sections of the line.

A further object of my invention is to arrange for the reclosing of a sectionalizing breaker in response to line voltage and a high-frequency control voltage in either of the sections connected to the breaker.

In accordance with my invention, the sectionalizing breakers of a loop feeder system are arranged to open on no-voltage when the system is de-energized by the opening of the main circuit breakers on the occurrence of a fault. The main circuit breakers are then reclosed, and the sectionalizing breakers are thereafter reclosed, one at a time, until the loop is built up in both directions from the station to the faulty section.

The means for operating the sectionalizing breakers comprises a tuned relay responsive to a high-frequency current and means for superposing such high-frequency current on the main supply lines. Indicating means are provided in the control station for showing how many sectionalizing breakers are closed, whereby the faulty section may be located.

For a complete understanding of my invention reference should be had to the accompanying drawings, in which Figure 1 is a circuit diagram of a radial transmission line to which my invention is applied, and Fig. 2a is a portion of a diagram of a preferred form of my invention comprising a loop transmission line, adapted to be connected to a source of power by main circuit breakers, and to be divided into separate sections by sectionalizing breakers.

Fig. 2b is another portion of the system shown partially in Fig. 2a.

Referring to Fig. 1, 1 illustrates an alternating-current generator which supplies energy, through a main circuit breaker 2, to a transmission line consisting of sections 3, 4 and 5. Sectionalizing breakers 6 and 7 are provided to connect sections 3 and 4, and 4 and 5, respectively. An actuating coil 8 is arranged to close the main circuit breaker 2, when energized by the closure of a switch 9 which connects the coil 8 to the battery 10. Although the switch 9 is illustrated as a push-button switch, it is to be understood that this switch may be operated automatically or that it may be remotely controlled.

The circuit breaker 2, when closed, is latched in that position by a latch 11, in co-operation with a tension spring 12. A trip coil 13 is arranged to trip the main circuit breaker 2 when the current in the main conductors exceeds a predetermined value, the trip coil 13 being energized by the current transformers 14 in the main conductors. The circuit including the trip coil 13 is intended to be merely an example of a protective relay circuit, it being understood that one of any suitable type may be substituted for that shown.

For controlling the operation of the sectionalizing breakers 6 and 7, as will be hereinafter more completely explained, I provide an alternating-current source 15 designed to generate an alternating current of high frequency. This high-frequency control current is superposed on the main transmission conductors by means of a transformer 16 which is adapted to be connected to the source 15 by the closure of a switch 17 actuated by push button 18.

The push button 18 is also arranged to actuate a contact 19 which, when closed, completes a circuit from the battery 10 to the operating coil 20 of a notching relay 21. This relay consists of a ratchet wheel 22, and a pawl 23 which is actuated by the core of the operating coil 20. A spring-pressed detent 24 is arranged to retain the ratchet wheel 22 in the position to which it is rotated by the pawl 23. The solenoid 25 is arranged to retract the detent 24 to release the ratchet wheel 22, the circuit to the solenoid 25 being closed by the contact 26, which is closed when the main circuit breaker 2 is opened. The ratchet wheel 22 is provided with a pointer and scale, the function of which is to indicate to the operators of the control station how many sectionalizing breakers have been reclosed.

The means for controlling the operation of the sectionalizing breaker 6 comprises a transformer 35 connected to the main line conductors, and conductors 35a and 35b, connected to the secondary of the transformer 35, to supply energy to the various elements of the circuit-breaker-controlling system.

The sectionalizing breaker 6 is controlled by a voltage relay 36 having an operating coil 37, connected across the conductors 35a and 35b, and arranged to connect the stationary contacts 39 and 40, by means of a bridging contact 38, when the coil 37 is energized.

The voltage relay 36 is arranged to control a tuned circuit consisting of a condenser 41 and the operating coil 42 of a relay 43 having a bridging contact 44 and stationary contacts 45 and 46. The tuned relay 43 is designed to be responsive only to the frequency of the voltage generated by the control source 15, and, when energized by a voltage of that particular frequency, the relay 43 operates to connect the stationary contacts 45 and 46 by means of the bridging contact 44.

The operation of the relay 43 completes a circuit from the conductor 35a, through contacts 39, 38 and 40 of the relay 36 and contacts 46, 44 and 45 of the relay 43, to the operating coil 47 of a relay 48 and thence to the conductor 35b. The relay 48 is provided with three sets of stationary contacts namely 52—53, 54—55 and 56—57 which are arranged to be bridged, respectively, by the bridging contacts 49, 50 and 51 when the operating coil 47 is energized.

The contact 49 is arranged to complete a circuit to the operating coil 47 in shunt with the bridging contact 44 so that the relay 48 is locked in when the relay 43 is once operated. The contacts 50 and 51 are arranged to complete a circuit to the operating coil 58 of the sectionalizing breaker 6 from the conductors 35b and 35a.

The means controlling the operation of the sectionalizing breaker 7 is an exact duplicate of that shown in connection with sectionalizing breaker 6, and the circuits of the controlling means for the breaker 7 are merely indicated.

Having described the apparatus necessary to the functioning of my invention, as applied to a radial transmission line, I will now proceed to describe the operation of such system.

Assuming first that normal conditions exist on the transmission line, the main circuit breaker 2 and the sectionalizing breakers 6 and 7 will be closed. The main circuit breaker 2 will be latched in by the latch 11, while the sectionalizing breakers 6 and 7 will be maintained in the closed position by the energization of their respective operating coils 58 and 59. The operating coil 58 of the circuit breaker 6 is energized by the transformer 35 through the contacts 50 and 51 which are closed because of the energization of the operating coil 47 of the relay 48. The relay 36 is also energized since it is connected directly to the conductors 35a and 35b. The tuned relay 43, being shunted, is deenergized. The tuned relay may also be deenergized because, during normal operation, with relay 6 closed, the high-frequency current need not be impressed on the system, i. e. switch 17 is open.

If an excessive overload is now placed on the generator 1 by the occurrence of a fault in any one of the sections of the transmission line, the main circuit breaker 2 will be opened as a result of the energization of the trip coil 13 which actuates the latch 11 to release the main circuit breaker 2. As stated above, the particular relay circuit shown is merely an example, and any other protective circuit may be employed. The opening of the main circuit breaker 2 causes the entire transmission line to be deenergized. This results in the deenergization of the transformers 35 and 60 and all of the control apparatus connected thereto. The circuit breakers 6 and 7 are thereupon opened. These circuit breakers should be designed so that they respond to the deenergization of the system only after a predetermined time interval. The reason for this design is to enable the main circuit breaker 2 to interrupt the fault current which may be of a value beyond the interrupting capacity of the sectionalizing breakers 6 and 7.

After the occurrence of a fault, service may be restored on all sections of the line between the generating station and the faulty section as follows: The main circuit breaker 2 is reclosed by actuation of the switch 9 to energize the closing coil 8 of the circuit breaker. When the circuit breaker 2 is latched in, section 3 of the system is energized. Consequently, the voltage relay 36 is energized to close its contact 38.

The reclosing of the first sectionalizing breaker 6 may be accomplished by closing the switch 17, to superpose upon the transmission line conductors a current impulse of high frequency. This high-frequency impulse causes the energization of the tuned relay 43 which thereupon causes the contact 44 to complete the circuit to the operating coil 47 of the relay 48, whereby the operating relay 58 of the sectionalizing breaker 6 is energized to cause its reclosure.

Simultaneously with the transmission of the high-frequency impulse to the tuned relay, a circuit is completed by the contact 19 of the switch 18, to the operating coil 20 of the notching relay 21. The energization of the coil 20 causes the operation of the pawl 23 and the ratchet wheel 22 and moves the pointer connected thereto to indicate that one sectionalizing breaker has been reclosed.

When the first sectionalizing breaker 6 has been reclosed by the process above outlined, the remaining sectionalizing breakers may be successively reclosed. Assuming that the fault which caused the opening of the main circuit breaker is located in the section 5, when the sectionalizing breakers 6 and 7 have been closed, if the fault persists the main circuit breaker will again open. The notching relay 21, however, will indicate to the operator of the main station, the section in which the fault occurred, and he will then be able to reconnect to the generator, the sections between it and the faulty section. If the fault has been removed, of course, the entire transmission line may be reconnected to the generator by the successive reclosing of the sectionalizing breakers.

One disadvantage of the radial transmission line shown in Fig. 1 is obvious from the above description of operation, namely, that, when a fault occurs on the line, service is interrupted on all sections between the fault and the end of the line, and it is possible to restore service only to those sections between the generator and the fault. This disadvantage is overcome in the loop transmission line shown in Figs. 2a and 2b.

In this modification of my invention, the loop transmission line begins and ends at a branch 70 which may be a generating-station bus, a sub-station bus, or a tie line between two points of a larger network. Connected to the branch 70 is a loop 71. A circuit breaker 72 is provided to disconnect the sections of the branch 70. The left end of the loop 71 is arranged to be connected to the branch 70 by means of a main circuit breaker 73, as shown in Fig. 2a, and the various sections of the loop are connected together by means of sectionalizing breakers 74, 75, 76, 77 and 78.

The main circuit breaker 73 is adapted to be closed by the energization of a closing coil 79 and latched in by a latch 80. The latch is adapted to be opened by a trip coil 81 energized by current transformers 82. Other protective circuits may, of course, be used to energize the trip coil 81. The closing coil 79 is in series with the battery 88' and switch 84 which, when closed, causes the closing of the main circuit breaker 73. The circuit breaker is provided with a back contact 79', the function of which is to reset an indicator which shows how many sectionalizing breakers have been reclosed.

At 85 is indicated a source of high-frequency control current which may be a generator, driven by any convenient means, such as the direct-current motor 86. A transformer 86' is provided to superpose on the transmission line conductors, current impulses from the high-frequency control source 85, the circuit being controlled by a contact 87 of a push-button switch 88. The switch 88 is also provided with a contact 89 which, when closed, completes a circuit to the operating coil 90, of the notching relay indicator 91. This indicator is similar to that shown at 21 in Fig. 1, and consists of a pawl 92 actuating a ratchet wheel 93, which is locked in position by a detent 94. The detent 94 is adapted to be withdrawn by the energization of a solenoid 94' through the back contact 79' of the circuit breaker 73 when that circuit breaker is opened. The ratchet wheel 93 is provided with a pointer and scale, the purpose of which is to indicate the number of sectionalizing breakers that have been reclosed since the last opening of the main breaker 73.

The control apparatus just described is an exact duplicate of that shown in Fig. 1 and operates in the same manner to transmit impulses of high frequency over the transmission lines to control the re-closing of the sectionalizing breakers.

The sectionalizing breaker 74 is controlled by relays similar to those described in connection with Fig. 1. A transformer 95 is connected to the transmission line, and to a voltage relay 96 having a contact 97. The operation of the relay 96 is delayed for a short time after the energization of its operating coil by any convenient means, such as a dash pot 98. A relay 99 is connected in series with a condenser 100 in a tuned circuit across the transformer 95 and is adapted, when energized, to cause its contact 101 to complete a circuit through the upper operating coil 102 of a double-throw relay 103, the circuit being from transformer 95, through contacts 97 and 101, and thence back to the other side of the transformer 95. This relay is provided with a plurality of contacts 104, 105 and 106, which are closed when the upper coil 102 is energized. The relay is also provided with contacts 107, 108 and 109 which are closed when the lower coil 110 is energized. The moving elements of the relay are supported by springs 111 and 112 in the neutral position.

The energization of the lower operating coil 110 of the relay 103 is governed by a transformer 114 connected to the transmission line, a voltage relay 115, and a relay 118, in a tuned circuit including a condenser 119, which are similar in all respects to the corresponding elements for controlling the operation of the upper coil 102 of the same relay. The contacts 104 and 109, when closed, shunt contacts 101 and 120 of the tuned relays 99 and 118, respectively. The contacts 105 and 106, when closed, connect the operating coil 113 of the sectionalizing breaker 74 to the transformer 95. Similarly, contacts 108 and 109 connect the operating coil 113 of the circuit breaker 74 to the transformer 114, when the lower coil 110 of the relay 103 is energized.

It will thus be seen that the relays for controlling the operation of the sectionalizing breaker 74 are duplicated and may be energized from either side of the sectionalizing breaker.

The remaining sectionalizing breakers 75, 76 and 78 are provided with identical controlling apparatus which is illustrated in detail only in connection with the last mentioned.

The right-hand end of the loop 71 is connected to the corresponding section of the branch 70 by a main circuit breaker 130, which is arranged to be closed by an operating coil 131, and latched by a latch 132, as shown in Fig. 2b. A trip coil 133, energized by current transformer 134, is provided to release the main circuit breaker upon the occurrence of an abnormal condition. The controlling means associated with the main circuit breaker 73 is duplicated, as shown in connection with circuit breaker 130. A switch 135 controls the energization of the operating coil 131 of the circuit breaker 130 from the battery 137. The transformer 138 superposes high-frequency impulses from the source 85 to which it is connected by conductors 139, on the main line conductors, and is controlled by switch 136 having contact 136a in series with the primary of the transformer 138 and the high-frequency generator 85. Although I have shown a single source of high-frequency control current for supplying both ends of the loop circuit, it is obvious that this is advisable only when the branch 70 is a power-station bus. In other cases, it will probably be desirable to supply different sources of control current for each end of the loop.

The switch 136 is also provided with a contact 140 for energizing the operating coil 141 of a notching relay 142. This relay, which is similar to those previously described, consists of a pawl 143 actuating a ratchet wheel 144 which is locked in position by a detent 145. The detent is adapted to be withdrawn by the energization of a solenoid 146 in response to the closure of a switch 147 which is closed when the main circuit breaker 130 is open.

The high-frequency impulses for controlling the operation of the sectionalizing breaker 78 are picked up by transformer 150. This transformer also energizes the voltage relay 151, which closes it contacts 152 after a short time delay, introduced by the dash pot 153 or any other suitable means. The relay 154 has its operating coil in a tuned circuit including the condenser 155 across the transformer 150 and is responsive only to current of the frequency of the control source 85. The operating coil 157 of a double-throw relay 158 is arranged to be connected across the transformer 150 by the closing of the contact 156 of the relay 154.

The relay 158 is identical with the relay 103, and, in addition to the upper operating coil 157, is provided with contacts 159, 160 and 161 which are closed when the upper coil is energized and also with contacts 162, 163 and 164 which are closed when the lower coil 165 is energized. The moving parts of the relay are supported in the neutral position by the springs 166 and 167. The contact 159, when closed, shunts the contact 156 of the tuned relay 154. The contacts 160 and 161 connect the operating coil 168 of the sectionalizing switch 78 to the transformer 150.

A transformer 169 is connected to the main transmission lines and serves to energize a voltage relay 170 having a contact 171, which is closed after a short time delay introduced by a dash pot 172. The transformer 169 also transmits high-frequency impulses from the source 85 to the relay 173 which is in a tuned circuit including the condenser 174, connected across the transformer 169. The relay 173 is provided with a contact 175 which, when closed, connects the lower operating coil 165 of the relay 158 to the transformer 169.

As above indicated, control apparatus, identical with that shown and described in connection with sectionalizing breakers 74 and 78, is provided to control the operation of breakers 75, 76 and 77. This apparatus, however, is not shown in detail and is only indicated by the transformers 121, 122, 123, 124, 125 and 126.

The operation of the system shown in Figs. 2a and 2b is similar to that shown in Fig. 1. Assuming first that normal conditions exist on the line and that the switch 72, the main circuit breakers 73 and 130 and all sectionalizing circuit breakers are closed, the occurrence of a fault in any section such, for example, as that between breakers 76 and 77, will cause the opening of the main circuit breakers 73 and 130 because of the energization of the trip coils 81 and 133. As explained in connection with Fig. 1, the sectionalizing breakers should be arranged to open after a short time delay, when deenergized. As a means of introducing this delay, dash pots 179 and 180 are shown on the circuit breakers 74 and 78, but any other suitable means, electrical as well as mechanical, may be employed. Upon the deenergization of the loop 71, resulting from the opening of the circuit breakers 73 and 130, the operating coils of the various sectionalizing breaker are deenergized and the breakers open to isolate the sections from each other.

The operator may now reclose the main circuit breaker 73 by means of the switch 84, and the sectionalizing breakers may be successively reclosed by closing the switch 87 a sufficient number of times. The closing of the main circuit breaker energizes the first section of the line, and the first operation of the switch 87 causes a high-frequency impulse to be transmitted to the tuned relay 99. The relay 96 is energized by the energization of the first section, and the tuned relay is energized by the high-frequency impulse, with the result that the upper coil 102 of the relay 103 is energized and closes its contacts 104, 105 and 106. The contact 104 shunts the contact 101 of the tuned relay and locks the relay 103 in the upper position. The contacts 105 and 106 connect the operating coil 113 of the circuit breaker 74 to the transformer 95, causing the circuit breaker to close.

Similarly, sectionalizing breakers 75 and 76 may be closed, and, as each breaker is closed, the indicator 91 is advanced to show how many sectionalizing breakers have been reclosed.

If the fault has been removed when the circuit breaker 76 is reclosed, the remaining sections of the loop may be connected to the branch 70 by continued operation of the switch 87. If the fault persists, however, when the circuit breaker 76 is closed, the main circuit breaker 73 will again be tripped out because of the excessive current flowing to the fault.

As explained in connection with Fig. 1, the notching relay 91 is energized by the closing of contact 89 each time the switch 87 is operated to send out a high-frequency impulse to close a sectionalizing breaker. The indication of the pointer of the notching relay 91, when the main circuit breaker trips the second time, therefore, tells the operator on which section the fault has occurred, and the loop may again be built up by following the method above described, so that all sections up to the faulty section are reconnected to the branch 70.

The end of the loop connected to the right-hand end of branch 70 may be built up in the same manner, by closing the main circuit breaker 130, and then successively closing the various sectionalizing breakers by means of the high-frequency control current.

By means of the duplication of the control apparatus of the sectionalizing breakers, this system enables the operator to close any sectionalizing breaker from either side thereof. The sectionalizing breaker 74, for example, may be closed by the operation of switch 87 after the circuit breaker 73 has been closed, or it may be closed by the operation of switch 136 after the circuit breaker 130 has been closed, and the intervening sectionalizing breakers 75 to 78 have been reclosed. Thus, I obtain a distinct advantage in that my system makes possible the restoration of service, after the occurrence of a fault, to all sections of a ring transmission line except that one in which the fault occurs.

Although I have illustrated and described but two embodiments of my invention, it is, obviously, susceptible of various changes which will be apparent to those skilled in the art, and it is my intention that the invention shall not be deemed limited to the systems actually disclosed, except as defined by the appended claims.

I claim as my invention:

1. In a transmission line supplied with alternating-current electrical energy having a given frequency, said transmission line being divided into a plurality of sections, a circuit-breaker for interrupting the circuit between adjacent sections thereof, a relay for controlling the operation of said circuit-breaker and means for energizing said relay in response to normal line voltage and to a voltage of a predetermined frequency which differs from the frequency of the current in the transmission line at either side of the circuit-breaker.

2. In a transmission line supplied with alternating-current electrical energy having a given frequency, said transmission line being divided into a plurality of sections, a circuit-breaker for interrupting the circuit between adjacent sections thereof, a voltage relay responsive to the voltage of the transmission line, a tuned relay responsive to a predetermined frequency which differs from that of the line, and a relay responsive to the combined action of the tuned relay and the voltage relay for closing the circuit-breaker.

In testimony whereof, I have hereunto subscribed my name this 5th day of December, 1927.

ROY J. WENSLEY.